US006873607B1

(12) United States Patent
Hamada et al.

(10) Patent No.: US 6,873,607 B1
(45) Date of Patent: Mar. 29, 2005

(54) INTERFERENCE DETECTION METHOD AND AN INTERFERENCE AVOIDANCE METHOD

(75) Inventors: Tomokazu Hamada, Tokyo (JP); Youichi Moritani, Tokyo (JP); Takashi Kawabata, Tokyo (JP); Shuji Ito, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/529,553

(22) PCT Filed: Sep. 30, 1998

(86) PCT No.: PCT/JP98/04390

§ 371 (c)(1),
(2), (4) Date: Jul. 3, 2000

(87) PCT Pub. No.: WO00/19761

PCT Pub. Date: Apr. 6, 2000

(51) Int. Cl.⁷ .......................... H04B 7/212; H04B 15/00
(52) U.S. Cl. ........................ 370/321; 370/347; 455/63; 375/285
(58) Field of Search ................................. 370/321, 322, 370/324, 329, 234, 347, 348, 375, 376, 360, 349; 375/284, 285; 455/450, 509, 63, 67.3

(56) References Cited

U.S. PATENT DOCUMENTS 5,020,056 A    5/1991   Chennakeshu
5,355,522 A  * 10/1994   Demange ..................... 455/62
6,198,924 B1 *  3/2001   Ishii et al. ................. 370/462

FOREIGN PATENT DOCUMENTS

| EP | 0 713 300 A1 | 5/1996 |
|----|--------------|--------|
| EP | 0 722 226 A1 | 7/1996 |
| EP | 0 859 490 A2 | 8/1998 |
| EP | 0859 490     | * 8/1998 |
| GB | 0713 300     | * 5/1996 |
| JP | 0859490 A2   | * 8/1998 |
| WO | WO 93/22850 A1 | 11/1993 |
| WO | WO 98/13956 A1 | 4/1998 |

OTHER PUBLICATIONS

Kayama, H., et al., "A Packet–Channel Sharing Protocol for Dynamic Channel Assignment Systems", Global Telecommunications Conf., 1995, Conf. Record, Comm. Theory Mini–Conf., Globecom '95, IEEE Singapore Nov. 13–17, 1995, New York, N.Y., U.S., pp. 1162–1166.

* cited by examiner

Primary Examiner—Afsar Qureshi
(74) Attorney, Agent, or Firm—Rothwell, Figg, Ernst & Manbeck (57) ABSTRACT

In a radio communication system in which multiple access is carried out between a base station and a plurality of subscriber stations by a TDMA communication method, occurrence of the interference in the R channels through which the subscriber stations (21 to 24) issue a call request to the base station (1) can be detected precisely, and time slot arrangement of the R channels is changed by detecting the interference to thus avoid the interference.

11 Claims, 10 Drawing Sheets

INTERFERENCE DETECTION METHOD AND AN INTERFERENCE AVOIDANCE METHOD

TECHNICAL FIELD

The present invention relates to a method for detecting interference occurred between service areas, etc. in the TDMA radio communication and a method for avoiding the interference.

BACKGROUND ART

In the radio communication system in which a fixed number of frequencies are assigned and used repeatedly to service areas, which are arranged to cover continuously the surface, to carry out the multiple access between one base station provided in each service area and a plurality of subscriber stations by virtue of the TDMA method, since the service areas which employ the same frequency as that of user's own station are arranged at a distance, interference of radio waves which occurs between the service areas utilizing the same frequency must be prevented.

As an example of a means for preventing the interference between the service areas, the technology for tilting downward the antenna directivity of the base station is described in "Foundation of Mobile Communication" Chapter 10, Paragraph 10.2.5, supervised by Yoshihisa Okumura and Masaaki Shinji and published by the Institute of Electronics, Information and Communication Engineers, 1986.

Figure 1:
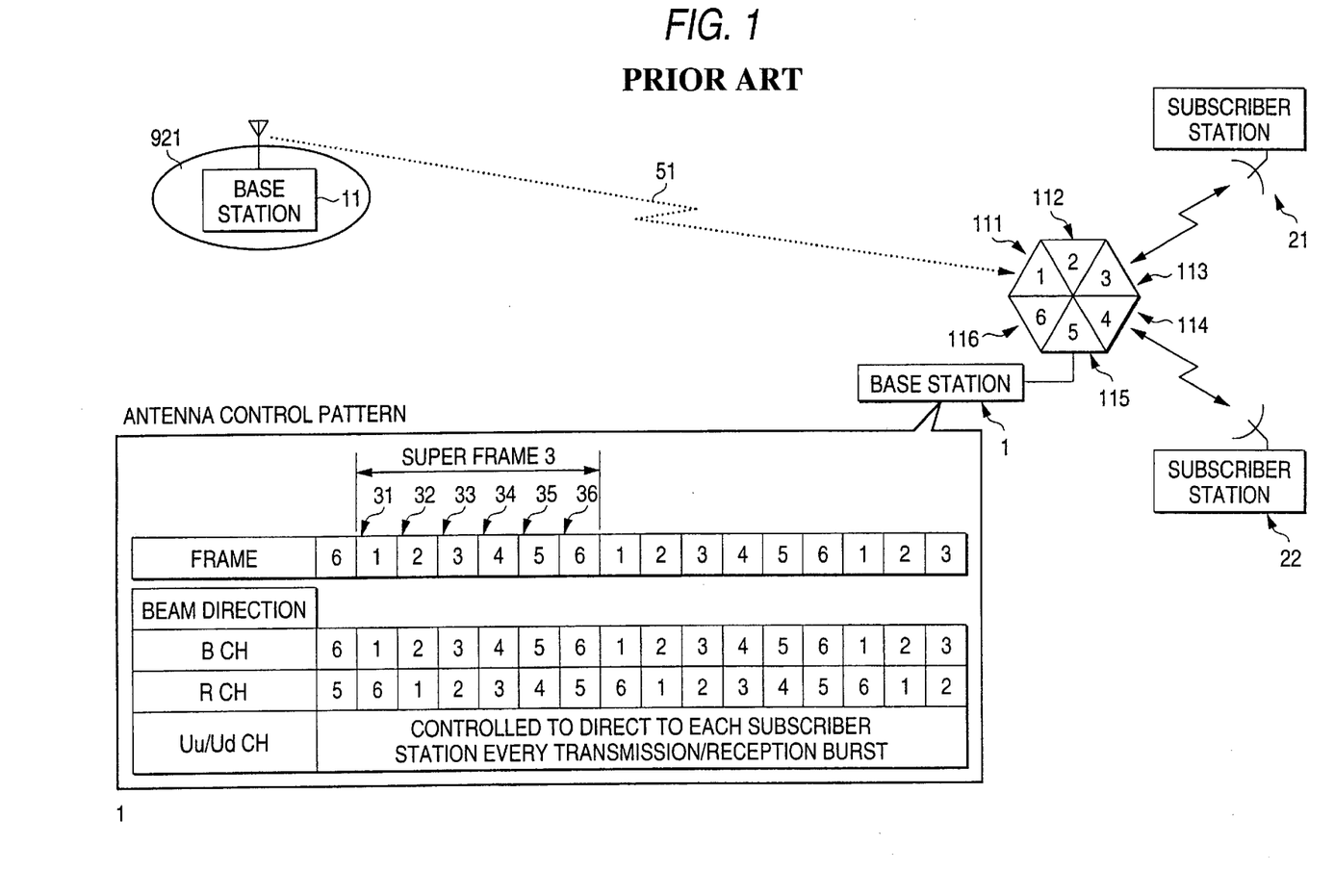
FIG. 1 is a diagram showing a method for avoiding the interference by switching a sector antenna.

FIG. 1 is a diagram showing a method which avoids the interference by splitting the service area into six sectors and then switching the antenna whose horizontal-plane directivity is narrowed (referred to as a "sector antenna" hereinafter) to respective sectors.

More particularly, a base station 1 can avoid the situation that an interference wave 51 incoming from other service area 921 which is located on the opposite side to the subscriber station is received, by using a third sector antenna 113 to communicate with a subscriber station 21 and using a fourth sector antenna 114 to communicate with a subscriber station 22.

Also, as for the down multiple address channel (Bch) used to transmit the message from the base station 1 to the subscriber stations 21, 22, the transmitting sector antenna is controlled to be switched sequentially, such as an antenna 111 in a TDMA frame 31, an antenna 112 in a TDMA frame 32, etc. Therefore, each of the subscriber stations 21, 22 can receive surely the multiple address channel once in the period of TDMA super frame 3. Similarly, as for the up access request channel (Rch) used to transmit the message from the subscriber stations 21, 22 to the base station 1, the subscriber stations 21, 22 can receive the up access request channel once in the period of TDMA super frame 3 without fail.

In the meanwhile, as an example of the method which detects and avoids positively the interference, procedures are decided in the second-generation cordless telephone system (PHS) such that a base station (CS) and a mobile station (PS) measure the FER (frame error rate) of the received signal respectively, then recognizes that interference occurs in the concerned communication channel if the FER exceeds a predetermined value, and then carries out an interference avoidance operation in the order of switching the channel to other channel on the same carrier, switching the channel to a channel on other carrier, switching the channel to a channel of other base station, automatic reconnection, temporary stop of transmission, and release of the radio channel, in response to the level of FER. These channel switching operations are carried out when the base station issues the instruction to the mobile station via a control channel. Also, if interference is detected by the mobile station, the channel switching is carried out when the mobile station issues the channel switching request to the base station.

Figure 2:
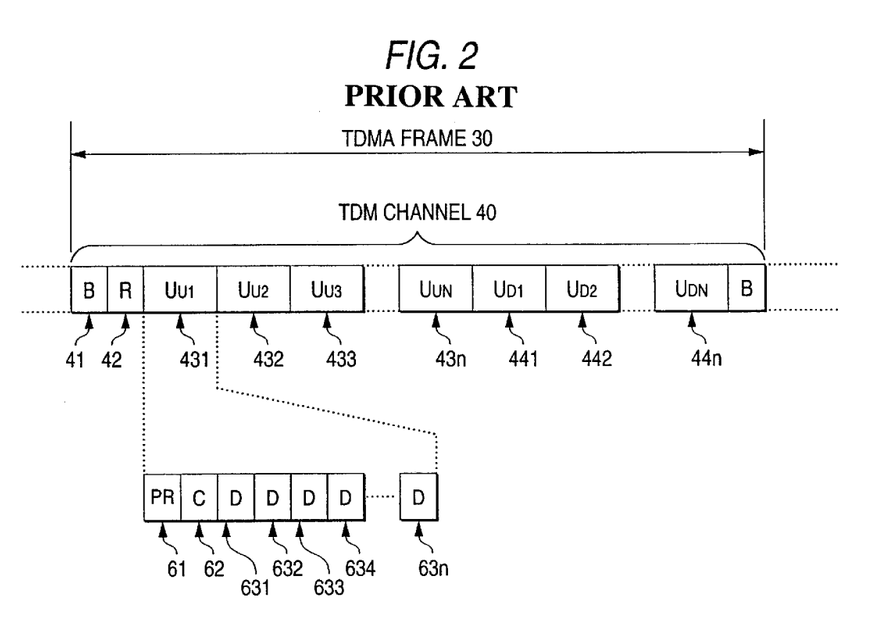
FIG. 2 is a frame configuration diagram showing a TDMA frame format.

FIG. 2 is a diagram showing an example of a TDMA frame format in such radio communication system. A TDMA frame 30 consists of four kinds of TDM channels 40 each having the different purpose, e.g., B channel 41, R channel 42, Uu channels 431 to 43n, and Ud channels 441 to 43n.

Figure 3:
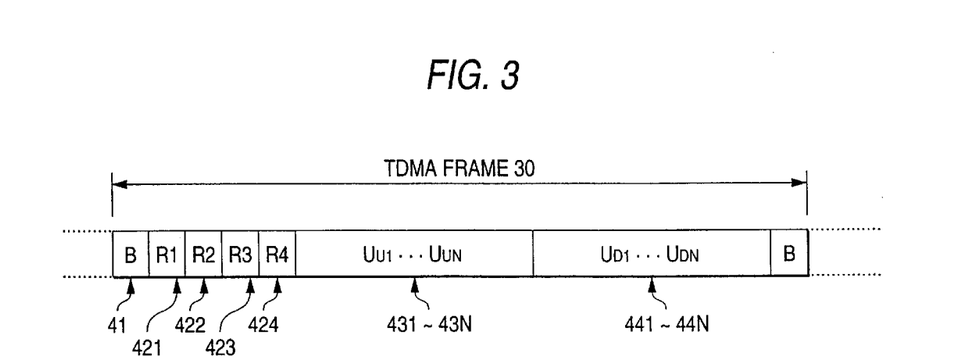
FIG. 3 is a frame configuration diagram showing another TDMA frame format.

The B channel 41 is the multiple address channel directed from the base station to the subscriber station, and used to inform the subscriber station of a frame timing synchronization and control information common to the subscriber stations. The R channel 42 is a channel used to issue the connection request from the subscriber station to the base station, and has normally a method to which respective subscriber stations can access at random. Accordingly, the collision of communication bursts occurs due to random access in the R channel. However, in order to reduce the collision occurring probability, as shown in FIG. 3, there exists the system in which a plurality of R channels (R1) 421 to (R4) 424 are arranged in one TDMA frame 30. Uu's are up user channels which are set one by one between the subscriber stations and the base station, and Ud's are similar down user channels. Each user channel consists of a preamble (PR) 61, an individual control information time slot (C) 62, and time slots (D) 631 to 63n having the number which corresponds to an amount of information.

In addition, in the method which measures an error rate of the received signal to detect the interference and then performs re-transmission of the interfered packet, change of the communication channel, etc., if the random access type channel such as the R channel is present, it is difficult to distinguish the interference from the collision because the collision of the transmitting bursts is assumed as the premise in such channel. In order to overcome this problem, based on the event the interference wave is not synchronized with the transmitting burst, an approach may be utilized which decides the receiving burst as the collision if such receiving burst lacks in all time slots and decides the receiving burst as the interference if such receiving burst lacks partially.

However, in the radio communication system which performs the multiple access between one base station and a plurality of subscriber stations by virtue of the TDMA method, if the surface service is intended to achieve, the avoidance of the interference only by using the antenna directivity is limited because of the topographical complexity of the service areas, etc. In addition, the system typified by the PHS, in which both the base station and the subscriber stations make arrangements to avoid the interference, is effective as the system which avoids the interference in the user channels, but such system cannot effectively function in the channel, which is used commonly by a plurality of subscriber stations, such as the multiple access channel, the random access type channel, etc.

Further, in the system typified by the subscriber radio access system, which has a large transmission capacitance per channel and in which the burst length of the user channel is varied in response to the service, there are the cases where the burst length of the interference wave is longer several times than the random access channel. Therefore, this system contains such a problem that, if all time slots of the random access channel are left out, it is impossible to distinguish the interference from the collision.

Moreover, in the case of the communication system in which the base station and the subscriber stations are fixedly operated, since both the interfering station and the interfered station are not moved, the influence of the interference lasts for a long time once they are affected by the interference.

As a result, the avoidance of the interference onto the multiple access channel and the random access channel is difficult, and the particular subscriber stations get into the situation that they cannot be connected for a long time once the interference occurs.

The present invention has been made in view of the above problems, and it is an object of the present invention to provide a method for detecting precisely occurrence of the interference in the TDMA radio communication and provide a method for avoiding effectively the interference.

DISCLOSURE OF THE INVENTION

The present invention provides an interference detection method for a radio communication system in which multiple access is carried out between a base station and a plurality of subscriber stations by a TDMA method and a plurality of random access channels are assigned to one frame of the TDMA method, wherein it is decided that, when a reception-unable detection rate in a random access channel is increased larger than reception-unable detection rates in other random access channels by more than a predetermined value, interference occurs in the random access channel. Therefore, it is possible to discriminate the collision from the interference on the channel, and thus only the interference can be detected precisely.

The present invention provides an interference detection method for a radio communication system in which multiple access is carried out between a base station which has a sector switching type antenna and a plurality of subscriber stations by a TDMA method and one random access channel is assigned to one frame of the TDMA method, wherein it is decided that, when a reception-unable detection rate in a random access channel is increased larger than reception-unable detection rates in other random access channels by more than a predetermined value, interference occurs in the random access channel in the sector. Therefore, it is possible to discriminate the collision from the interference on the channel, and thus only the interference can be detected precisely.

The present invention provides an interference avoidance method for a radio communication system in which multiple access is carried out between a base station and a plurality of subscriber stations by using a TDMA method, wherein, when interference is detected from a random access channel for transmitting from a subscriber station to the base station, the base station closes the random access channel, changes arrangement of the channel to another time slot, and then informs the subscriber stations of close of the random access channel and time slot arrangement change information via multiple access channels. Therefore, the situation that the subscriber stations are brought into the access unable state to the base station can be prevented, and the interference can be avoided.

In the present invention, the base station listens the closed random access channel for a predetermined time to detect whether or not an interference wave is present. Therefore, continuation of the interference can be checked and thus the effective interference avoidance method can be adopted.

The present invention provides an interference avoidance method for a radio communication system in which multiple access is carried out between a base station and a plurality of subscriber stations by using a TDMA method, wherein the base station changes time slot arrangements of multiple access channels for transmitting to the subscriber stations and random access channels for receiving from the subscriber stations every predetermined frames, and informs the subscriber stations of time slot arrangement changing information via the multiple access channels which are selected prior to change of frames by at least one frame. Therefore, such a situation can be avoided that the random access channels in which the interference is difficult to detect do not function for a long time because of the interference disturbance.

In the present invention, a plurality of multiple access channels or random access channels are arranged in one frame, and time slot arrangement of at least one channel out of the multiple access channels or the random access channels is changed every predetermined frames. Therefore, such a situation can be avoided that the multiple access channels or the random access channels in which the interference is difficult to detect do not function for a long time because of the interference disturbance.

In the present invention, the base station changes time slot arrangement of the multiple access channels or the random access channels based on a previously decided pattern, and informs the subscriber stations of current information on the pattern in which the time slot arrangement is changed via the multiple access channels. Therefore, such a situation can be avoided that the multiple access channels or the random access channels in which the interference is difficult to detect do not function for a long time because of the interference disturbance. In addition, the probability that the subscriber stations miss positions of the multiple access channels can be lowered by using the fixed pattern.

The present invention provides an interference avoidance method for a radio communication system in which multiple access is carried out between a base station which has a sector switching type antenna and a plurality of subscriber stations by a TDMA method and one multiple access channel and one random access channel are assigned to one frame of the TDMA method, wherein the base station changes sector switching procedures in transmission/reception of these channels based on a previously decided pattern every super frame, and also informs the subscriber stations of current information on the pattern in which sector switching is changed via the multiple access channels. Therefore, disturbance of the multiple access channels or the random access channels caused by the interference wave, which occurs periodically in the particular sector, for a long time can be prevented.

The present invention provides an interference avoidance method for a radio communication system in which multiple access is carried out between a base station which has a sector switching type antenna and a plurality of subscriber stations by a TDMA method and one multiple access channel and one random access channel are assigned to one frame of the TDMA method, wherein the base station changes sector switching procedures in transmission/reception of these channels every super frame, and also informs the subscriber stations of the sector switching procedures after sector switching is changed via the multiple access channels which are selected prior to change of procedures by at least one frame. Therefore, disturbance of the multiple access channels or the random access channels caused by the interference wave, which occurs periodically in the particular sector, for a long time can be prevented.

BEST MODES FOR CARRYING OUT THE INVENTION

In order to explain the present invention in more detail, best modes for carrying out the present invention will be explained with reference to the accompanying drawings hereinafter.

Embodiment 1

Figure 4:
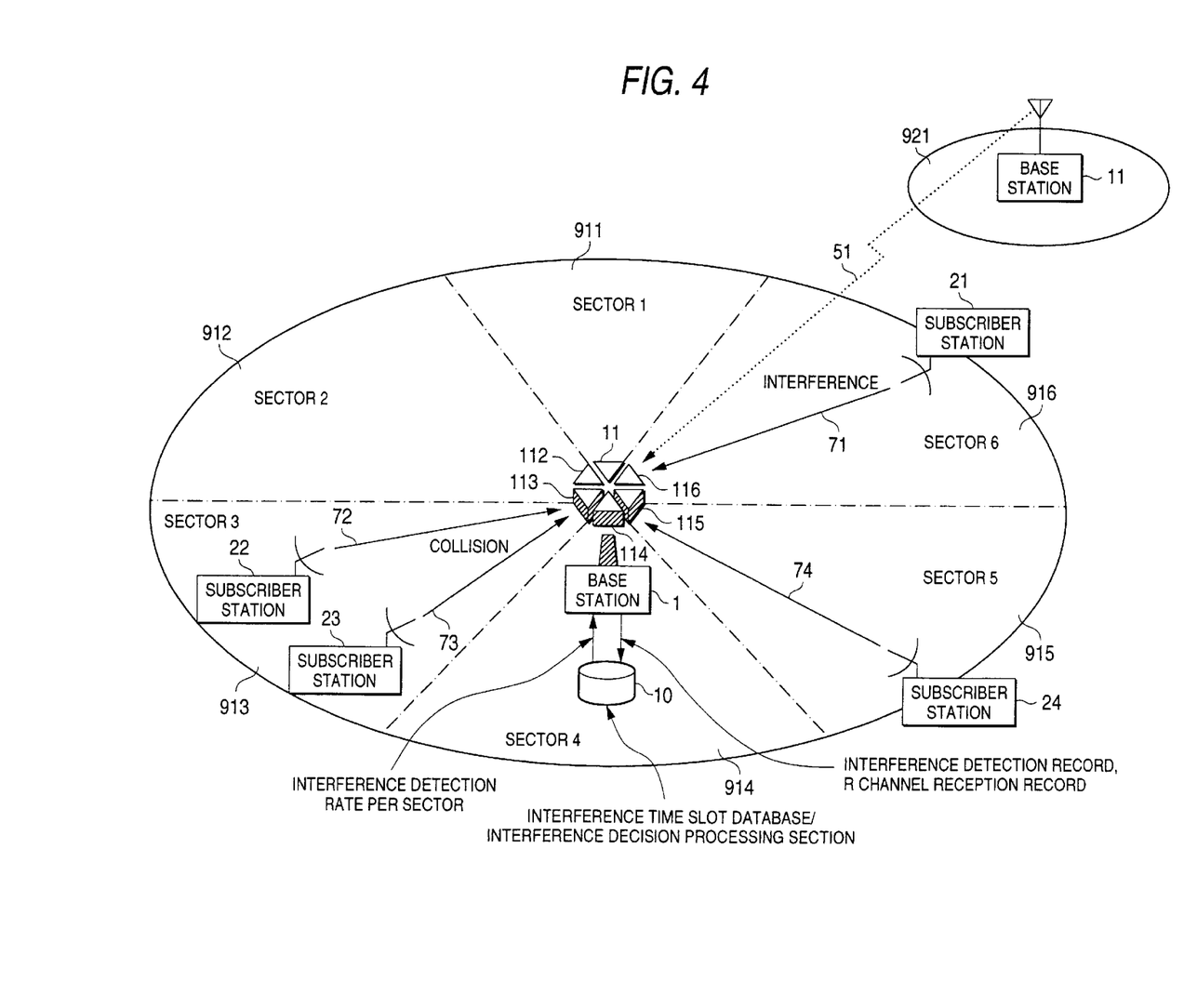
FIG. 4 is a diagram showing a peripheral configuration of a base station which has sector switching type antennas according to an embodiment 1 of the present invention.

An embodiment 1 of the present invention will be explained with reference to FIG. 1, FIG. 4, and FIG. 5 hereunder. In FIG. 4, assume that subscriber stations 21 to 24, which are accommodated in service areas 911 to 916 of a base station 1, issue an access request to the base station 1, which is equipped with sector switching type antennas 111 to 116, via R channels 71 to 74 respectively. Since the R channels consist of a random access channel, the collision of channels occur if access timing coincide with each other between the subscriber stations 22 and 23 in the sector 913, for example, and thus the interference is detected in the time slot by the base station 1.

Meanwhile, the radio wave 51 transmitted from a remote service area 921 interferes with the radio wave on an up channel 71 of the subscriber station 21. As a result, the base station 1 cannot receive the radio wave and, like the above, the interference is also detected in the concerned time slot.

The base station 1 inputs the interference detection number in the time slots, which are assigned to the R channel, into an interference time slot database/interference decision processing section 101 every sector 911 to 916. This interference decision processing section 101 calculates a value which is derived by dividing the interference detection number by the R channel receiving number of times (interference detection rate) every sector 911 to 916. In this case, the R channel receiving number of times is counted up by one when a value of the received electric field strength signal (RSSI) in the base station 1 exceeds a predetermined value in all time slots being assigned to the R channel.

Figure 6:
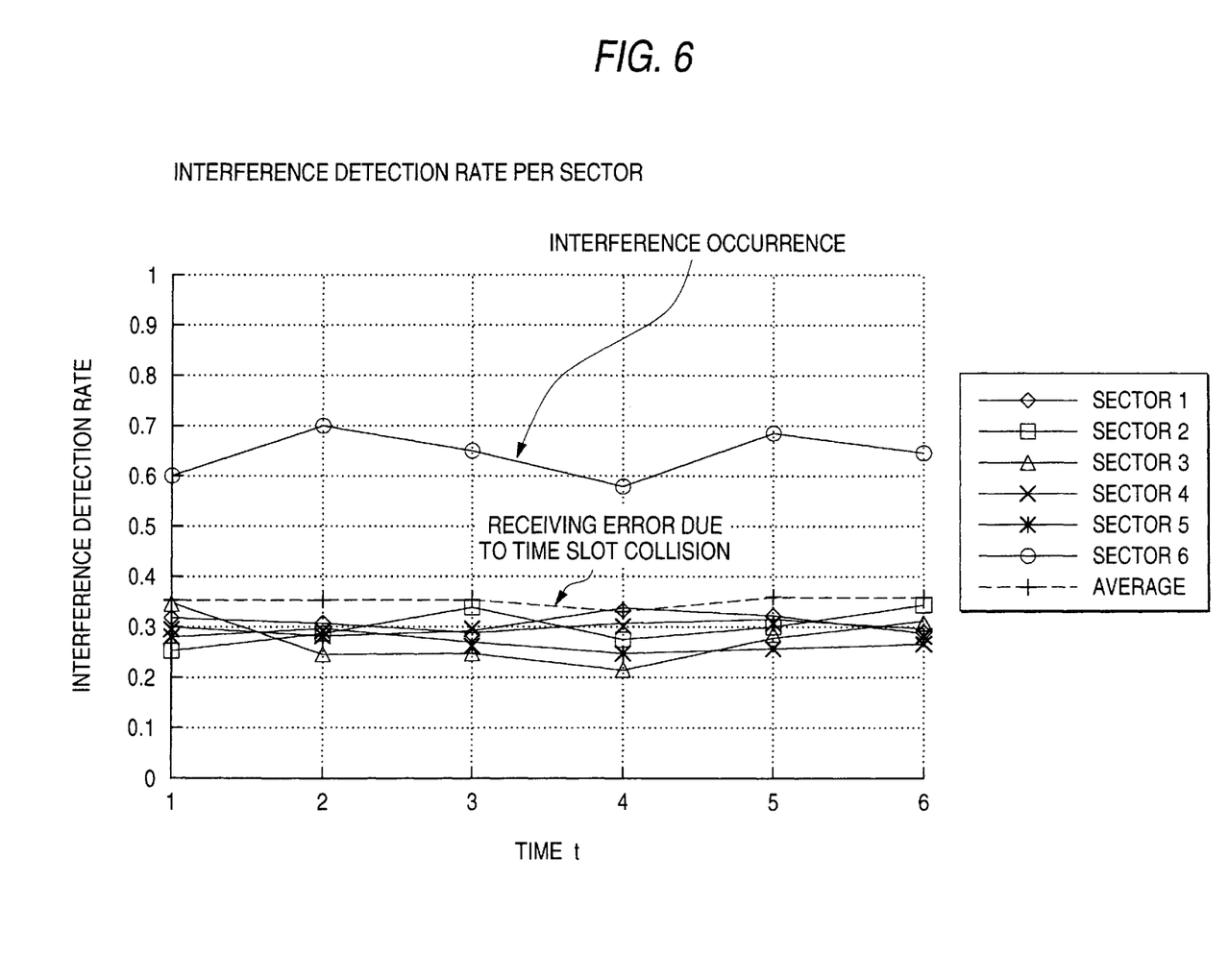
FIG. 6 is a characteristic diagram showing interference detection rates every sector.

FIG. 6 shows examples of interference detection rates every sector 911 to 916, which are calculated by the interference decision processing section 101. Since the R channel is of the random access type as described above, it is impossible to avoid the interference occurred always at a constant rate. Therefore, in the sectors 911 to 915 in which no interference wave 51 exists, the interference detection rate indicates a predetermined rate which corresponds to the channel number being accommodated in the sectors 911 to 915.

In contrast, since the influence of the interference wave is caused periodically over a plurality of frames unlike the collision of the R channel bursts, as shown in FIG. 6, the interference detection rate is increased in the sector 916, in which the interference wave 51 is present, rather than other sectors. The interference decision processing section 101 detects the sector 916 which has the larger interference detection rate than those in other sectors 911 to 915, and then decides that the interference has occurred in the concerned sector 916.

Figure 5:
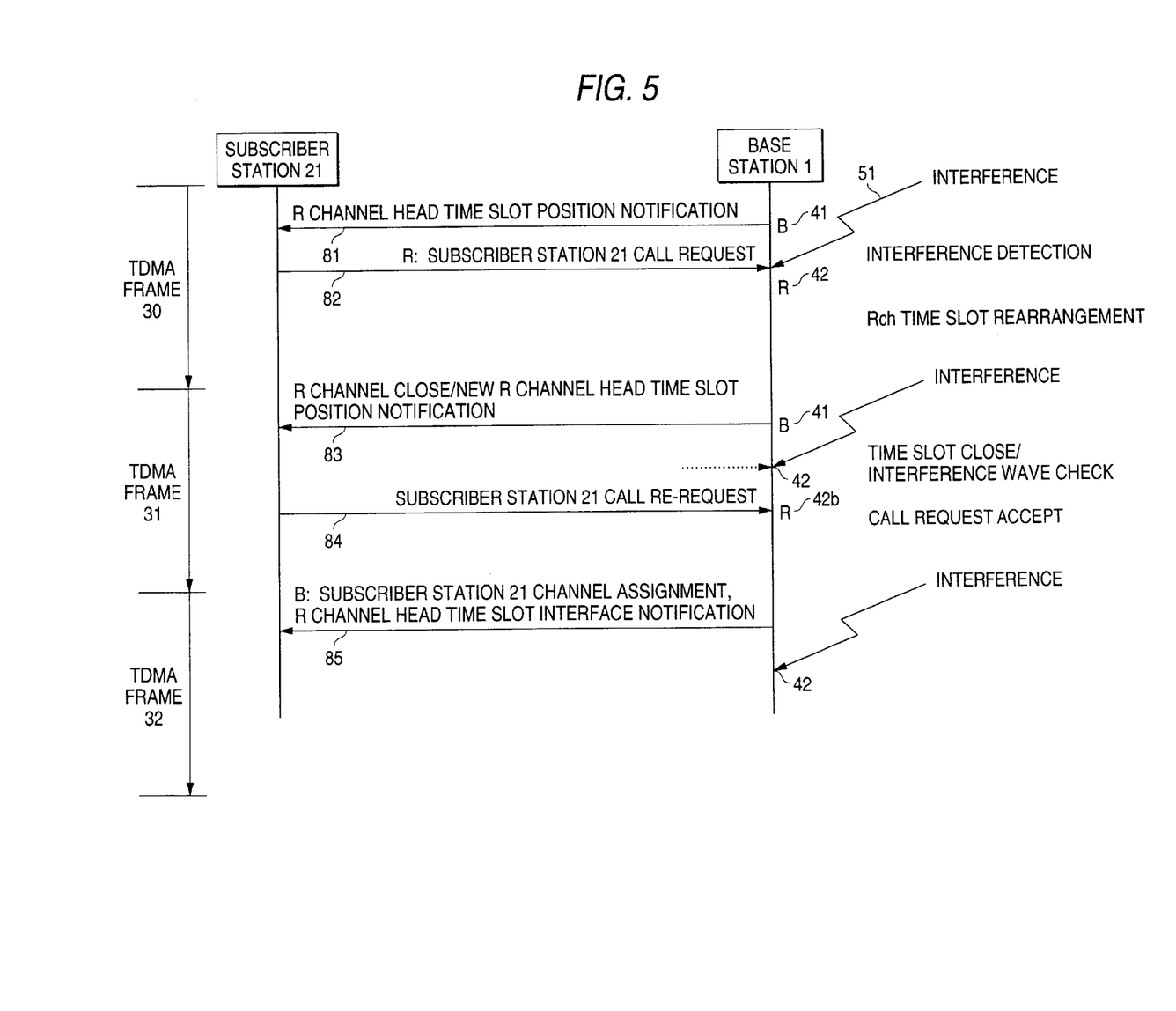
FIG. 5 is a diagram showing an operation according to the embodiment 1 of the present invention.

FIG. 5 is a diagram showing an example of an interference avoidance operation when the interference is detected in the R channel 42 by the above interference detecting method.

More particularly, in the TDMA frame 30, when the subscriber station 21 transmits the call request 82 to the base station 1 via the R channel 42 in the same TDMA frame 30 based on a head time slot position notification 81 transmitted from the base station 1 via the B channel 41, the interference wave 51 occurs and thus the call request 82 issued from the subscriber station 21 cannot be received by the base station 1. In this TDMA frame 30, when the base station 1 detects this interference, it sets another R channel 42b in the time slot without the interference. In the succeeding TDMA frame 31, the base station 1 transmits the close of the time slot on which the R channel 42 is arranged and the head time slot position notification 83 of the newly assigned R channel 42b via the B channel 41.

The subscriber station 21, when receives this notification 83, transmits the call re-request 84 via the R channel 42b of the newly assigned time slot. Since the R channel 42b has no influence of the interference wave 51, the base station 1 can accept the call request issued by the subscriber station 21. In the succeeding TDMA frame 32, the base station 1 transmits the head time slot position notification of the R channel as well as the channel assignment information 85 for the subscriber station 21 via the B channel.

Then, according to the close notification 83 of the R channel 42, all subscriber stations which are present in the service area of the base station 1 can stop all accesses in the closed time slot 42.

The base station 1 listens the closed time slot 42 to check the presence of the interference wave 51. Then, if the base station 1 can check the disappearance of the interference wave for a constant period or more in the concerned time slot, the R channel 42b is arranged again at the original time slot 42. In this case, the base station 1 may assign another channel to the concerned time slot 42, in place of rearranging the R channel 42b into the original time slot 42.

Embodiment 2

An embodiment 2 of the present invention will be explained with reference to FIG. 7 and FIG. 8 hereunder.

Figure 7:
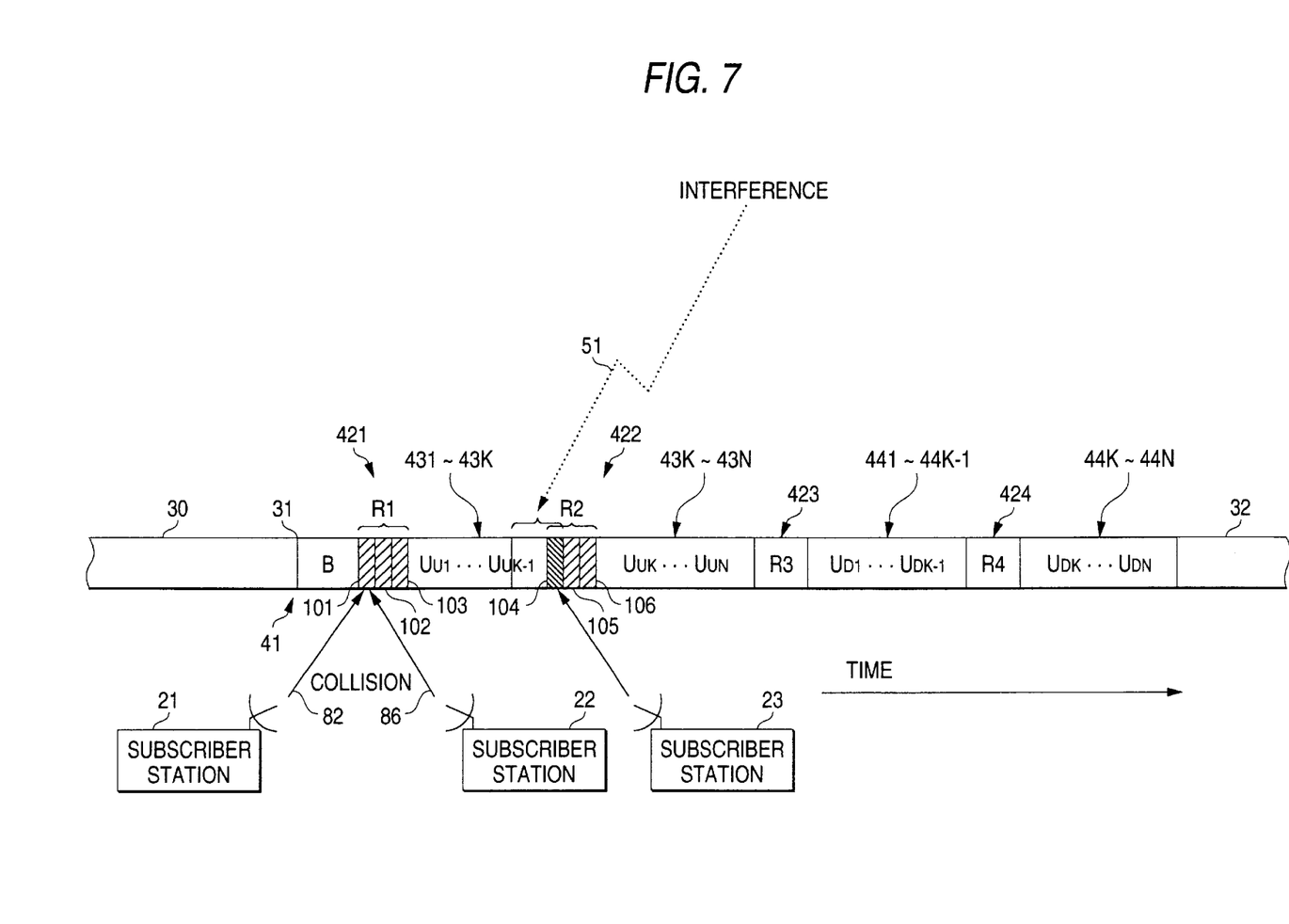
FIG. 7 is a frame configuration diagram showing a TDMA frame format according to an embodiment 2 of the present invention.
Figure 8:
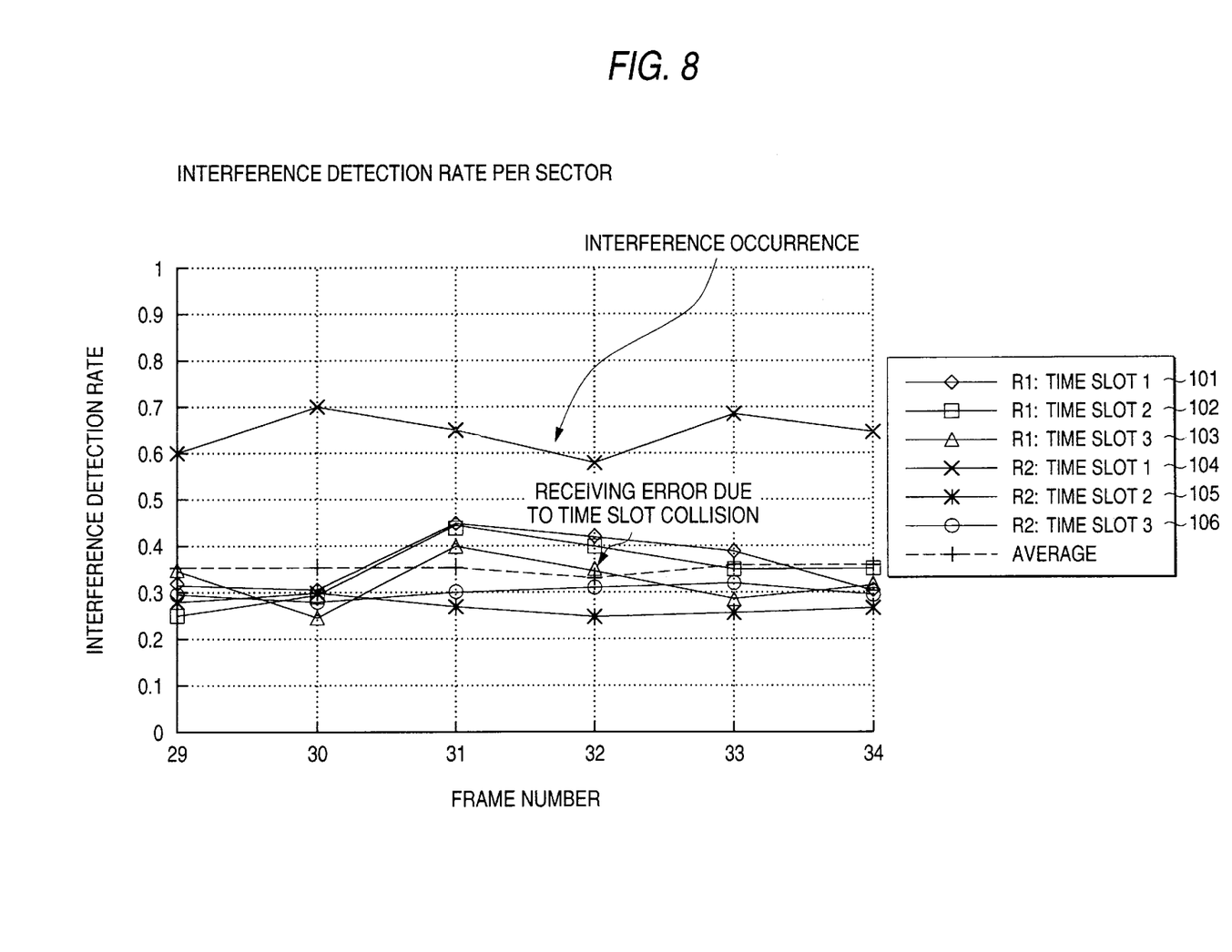
FIG. 8 is a characteristic diagram showing interference detection rates every sector.

In FIG. 7, references 30, 31, 32 denote an example of the TDMA frame in the radio base station respectively. In this TDMA frame, first to fourth R channels (referred to as "R1 to R4 channels" respectively hereinafter) 422 to 424 are arranged to be distributed between the up user channels $U_{U1}, \ldots, U_{UK-1}, U_{UK}, \ldots, U_{UN}$ and the down user channels $U_{D1}, \ldots, U_{DK-1}, U_{DK}, \ldots, U_{DN}$ respectively. The head time slot positions of the R channels are informed to the subscriber stations 21 to 23 via the B channel 41. Now, apart of the end portion of the up user channels $U_{U1}, \ldots, U_{UK-1}$ to a part of the head portion of the R2 channel 422 in the base station receives the interference 51 from other station. In the TDMA frame 31, the access request 82 from the subscriber station 21 and the access request 83 from the subscriber station 22 collides with each other on the R1 channel 421 to make the reception impossible.

The base station generates an interference detection database every time slot assigned to each R channel, and calculates a running average of the interference detection rate over a predetermined frame period. FIG. 8 shows the running average of the interference detection rates of time slots 101 to 106 constituting the R1 channel 421 and the R2 channel 422, which are calculated by the base station, relative to the time.

In the TDMA frame 31, since the collision occurs in the R1 channel 421, the running average values of the time slots 101 to 103 are increased. However, since the collision of the access requests is not continued over a plurality of frames, such collision never exceeds the collision occurring probability which can be previously set.

In contrast, the time slot 104 of the R2 channel 422, which is subjected to the interference of the other station, exhibits the high interference detection rate since the receiving unable state is continued over a plurality of frames.

The base station calculates an average value of the interference detection rates of the time slots assigned to all R channels every frame. Then, the base station decides that the interference occurs in the time slots in which the interference is detected at a predetermined rate in excess of this value and the collision occurs in the remaining time slots.

The avoidance method applied when the interference is detected has been explained in the above embodiment 1. As the threshold value for deciding the interference and the collision, a difference from the average value of all time slots may be employed like this method, or the collision occurring probability which is set previously at the time of channel design may be employed as a reference.

Embodiment 3

Figure 9:
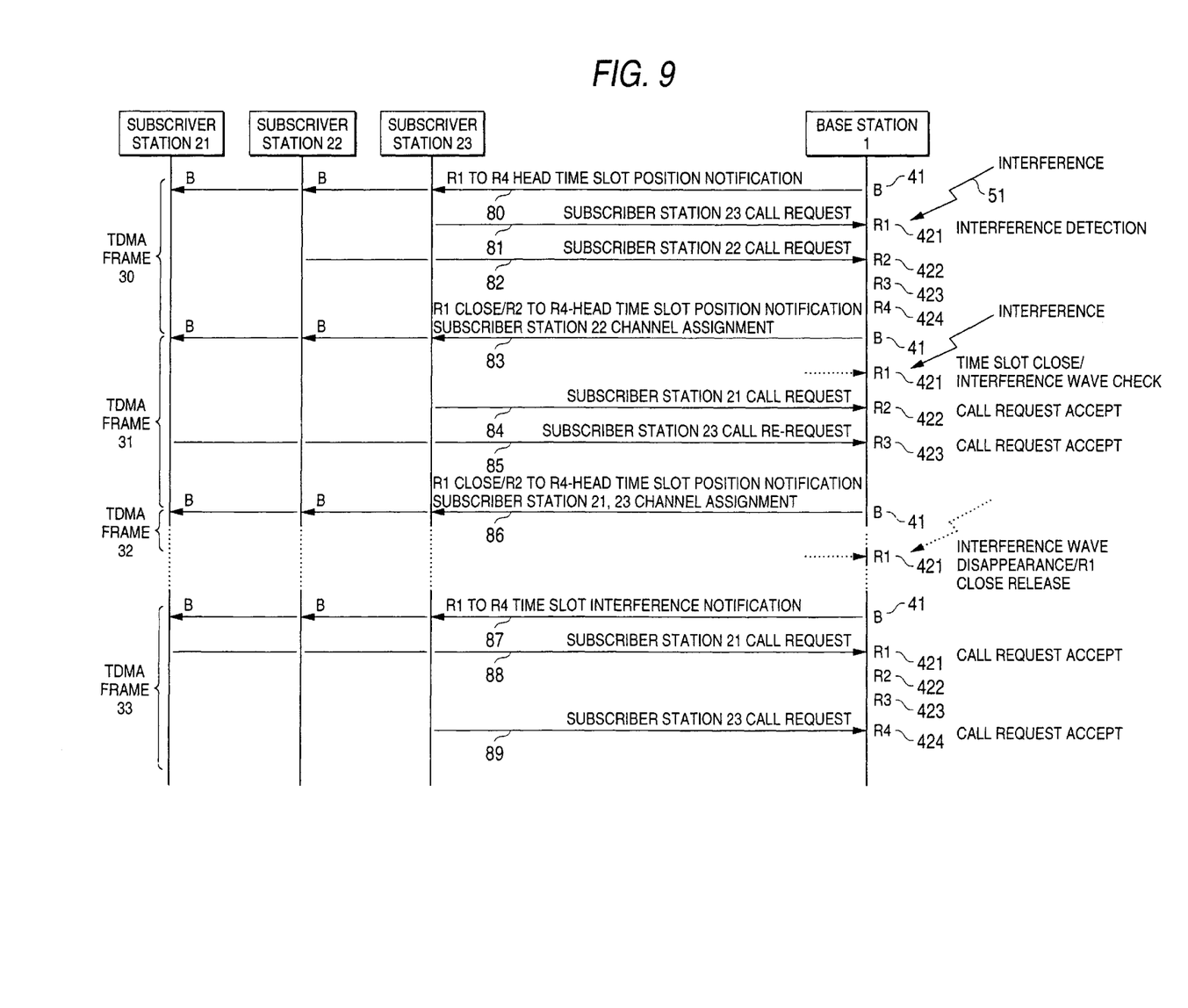
FIG. 9 is a diagram showing an operation of an interference avoidance method according to an embodiment 3 of the present invention.

FIG. 9 is a diagram showing an embodiment 3 of the present invention. The first to fourth R channels 421 to 424 are arranged in the TDMA frames 30 to 34 of the embodiment 3 respectively, and the head time slot positions of the R channels 421 to 424 are informed to the subscriber stations 21 to 23 via B channels 41 positioned at the head of respective frames.

Here, assume that, in the TDMA frame 30, the base station 1 transmits the head time slot position notification 80 of the R channels 421 to 424 to the subscriber stations 21 to 23 via the B channel 41 and then the subscriber station 23 transmits the call request 81 to the base station 1 via the R1 channel 421 and also the subscriber station 22 transmits the call request 82 to the base station 1 via the R2 channel 422. The call request 82 issued from the subscriber station 22 is accepted by the base station 1, but the call request 81 issued from the subscriber station 23 is not accepted because the interference 51 occurs in the R1 channel 421. At this time, the base station 1 has detected the interference by the means described in the above embodiment 1 or 2, and then broadcasts the notification 83 via the B channel 41 to the subscriber stations 21 to 23 in the succeeding TDMA frame 31 to inform the close of the R1 channel together with the head time slot position notification of the R2 to R4 channels and the channel assignment information for the subscriber station 22. The subscriber station 23, when receives this notification 83, interrupts the call request via the R1 channel 421 and then issues the call request 85 via the R1 channel 423. Also, in the TDMA frame 31, the subscriber station 21 issues the call request 84 via the R2 channel. These call requests 84, 85 issued from the subscriber stations 21, 23 are accepted by the base station 1. In the TDMA frame 32, the channel assignment information 86 together with the R1 channel close/R2 to R4 channel head time slot position notification is transmitted to the subscriber stations 21 to 23 via the B channel. In this case, the subscriber station 23 selects the R3 channel as another channel after it has interrupted the call request via the R1 channel, but this selecting procedure may conducted in the order of channel number or may conducted at random.

When all subscriber stations receive the R1 channel close notification via the B channel 41 in the TDMA frame 31, all subscriber stations which are located in the service area of the base station 1 stop the access to the R1 channel to thus complete the close of the concerned channel. In contrast, the base station 1 listens respective time slots in the closed R1 channel and also checks the presence of the interference wave for a predetermined time. After this, the base station 1 checks the same time slot periodically, then releases the close of the R1 channel 421 if the interference wave cannot be detected by a predetermined number of time, and then informs respective subscriber stations of the head time slot position information 87 of the R1 to R4 channels via the B channel 41 in the succeeding TDMA frame 33. Then, the base station 1 releases the notification of the close of the R1 channel 421.

In this case, like this embodiment, the close and check of the R channels 421 to 424 may be executed after the interference has been detected, otherwise the base station 1 may execute such close and check periodically.

Embodiment 4

Figure 10:
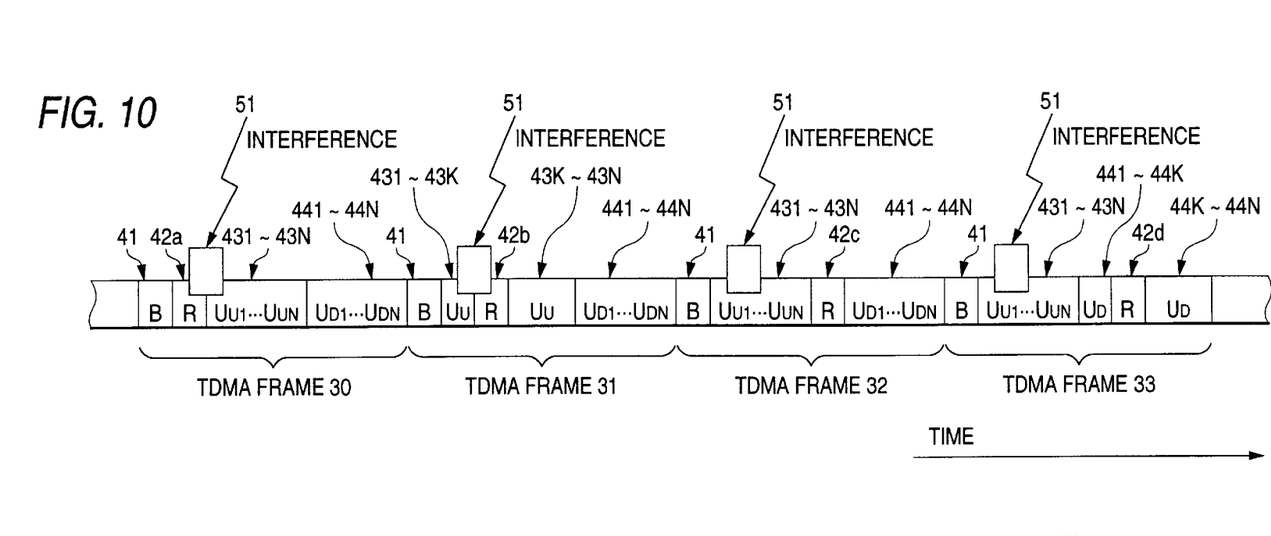
FIG. 10 is a frame configuration diagram showing a TDMA frame format of an interference avoidance method according to an embodiment 4 of the present invention.

FIG. 10 is a frame configuration diagram showing an embodiment 4 of the present invention. In FIG. 10, 30 to 33 denote a TDMA frame in the radio base station respectively. The TDMA frames 30 to 33 have one R channel 42 which is arranged at any position between the up user channels $U_{U1}, \ldots, U_{UN}$ or the down user channels $U_{D1}, \ldots, U_{DN}$, respectively.

In FIG. 10, the base station is subjected to the interference 51 from other station, so that the R channel 42a is brought into its unable state in the TDMA frame 30.

In the embodiment 4, the time slot positions of the R channel 42 are changed every frame, such as 42a in the frame 30, 42b in the frame 31, 42c in the frame 32, and 42d in the frame 33. Accordingly, as shown in FIG. 10, the R channels 42a, 42b cannot be used in the TDMA frames 30, 31 because of the influence of the interference wave 51, while the influence of the interference can be avoided in the TDMA frames 32, 33.

The time slot arrangement of the R channels, which is changed frame by frame, may be selected in accordance with the previously set pattern or the random pattern which is decided arbitrarily by the base station. In addition, the time slot whose interference is detected during its assignment as the user channel may be controlled such that succeeding assignment of the R channel may not be applied to such time slot.

The base station can prevent that the subscriber stations lose the position of the R channel as the result of above control, by informing simultaneously the head time slot position of the R channel in the current frame and the head time slot position of the R channel in at least the succeeding frame via the B channel 41 every frame.

Like the R channel 42, the arrangement of the B channel 41 may also be changed every TDMA frame. In this case, the base station transmits the head time slot position information of its own channel and the B channel transmitting position information at least in the succeeding frame in addition to the position information of the R channel to each subscriber station via the B channel 41.

Further, time slot arrangement changing timings of the B channel 41 and the R channel 42 may be switched every super frame in the system which employs the sector switching type antenna, etc.

Embodiment 5

Figure 11:
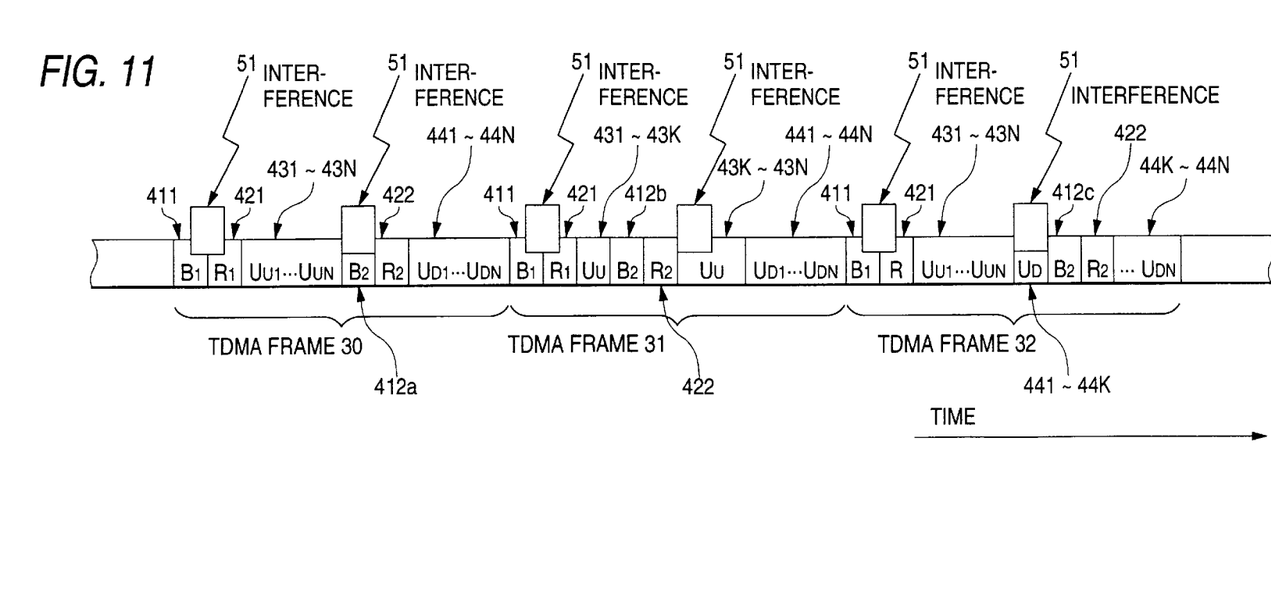
FIG. 11 is a frame configuration diagram showing a TDMA frame format of an interference avoidance method according to an embodiment 5 of the present invention.

FIG. 11 is a frame configuration diagram showing an embodiment 5 of the present invention. In FIG. 11, 30 to 32 denote a TDMA frame in the subscriber station respectively. The TDMA frames 30 to 32 have two B channels 411, 412 and two R channels 421, 422 respectively. The B channel 412 and the R channel 422 are arranged at any position between the up user channels $U_{U1}, \ldots, U_{UN}$ or the down user channels $U_{D1}, \ldots, U_{DN}$. In FIG. 11, all time slots of the up and down user channels are depicted for convenience. However, the individual subscriber station can communicate by using several time slots of these user channel group, which are assigned by the base station. In FIG. 11, this subscriber station now receives the interferences 51, 52 from a plurality of other stations, and the interference 51 interferes with the first B channel 411 and thus the frame synchronization according to the channel becomes impossible.

In the embodiment 5, since a plurality of B channels are arranged in one TDMA frame, normally the subscriber station can maintain the synchronization with the base station by receiving the second B channel 412 even if one of the B channels is brought into its receiving unable state by the interference 51 for a long time. However, in the case of FIG. 11, since both the first and second B channels 411, 412 receives the interference by the interference waves 51, 52 in the TDMA frame 30, it is impossible for the subscriber station to maintain the synchronization with the base station in this TDMA frame 30.

In the embodiment 5, the time slot positions of the B channel 412 are changed every frame, such as 412*a* in the frame 30, 412*b* in the frame 31, and 412*c* in the frame 32. Accordingly, the B channels 411, 412*a* cannot be used in the TDMA frame 30 because of the influence of the interference waves 51, 52, but the position-variable B channels 412*b*, 412*c* can be received in the TDMA frames 31, 32. Therefore, the subscriber station can maintain the synchronization with the base station.

The time slot arrangement of the B channels whose position can be changed frame by frame may be selected in compliance with the previously set pattern or the random pattern which is arbitrarily decided by the base station. In addition, the time slot whose interference is detected during its assignment as the user channel may be controlled such that succeeding assignment of the R channel may not be applied to such time slot.

The base station can prevent that the subscriber stations lose the position of the B channel as the result of above control, by informing the head time slot position of the B channel in the current frame and the head time slot position of the position-variable B channel in at least the succeeding frame at the same time via all B channels 411, 412 every frame.

Like the B channels 411, 412, as shown in FIG. 11, the arrangement of the R channels 421, 422 may also be changed every TDMA frame. In this case, the base station informs the subscriber stations of the head time slot position of the B channel which is now transmitting, the head time slot position of the position-variable B channel at least in the succeeding frame, the head time slot position information of the first and second R channels 421, 422, and the head time slot position information of the first and second R channels 421, 422 at least in the succeeding frame via the B channels 411, 412. Further, time slot arrangement changing timings of the first and second B channels 41 and the R channels 421, 422 may be switched every super frame in the system which employs the sector switching type antenna, etc.

Embodiment 6

Figure 12:
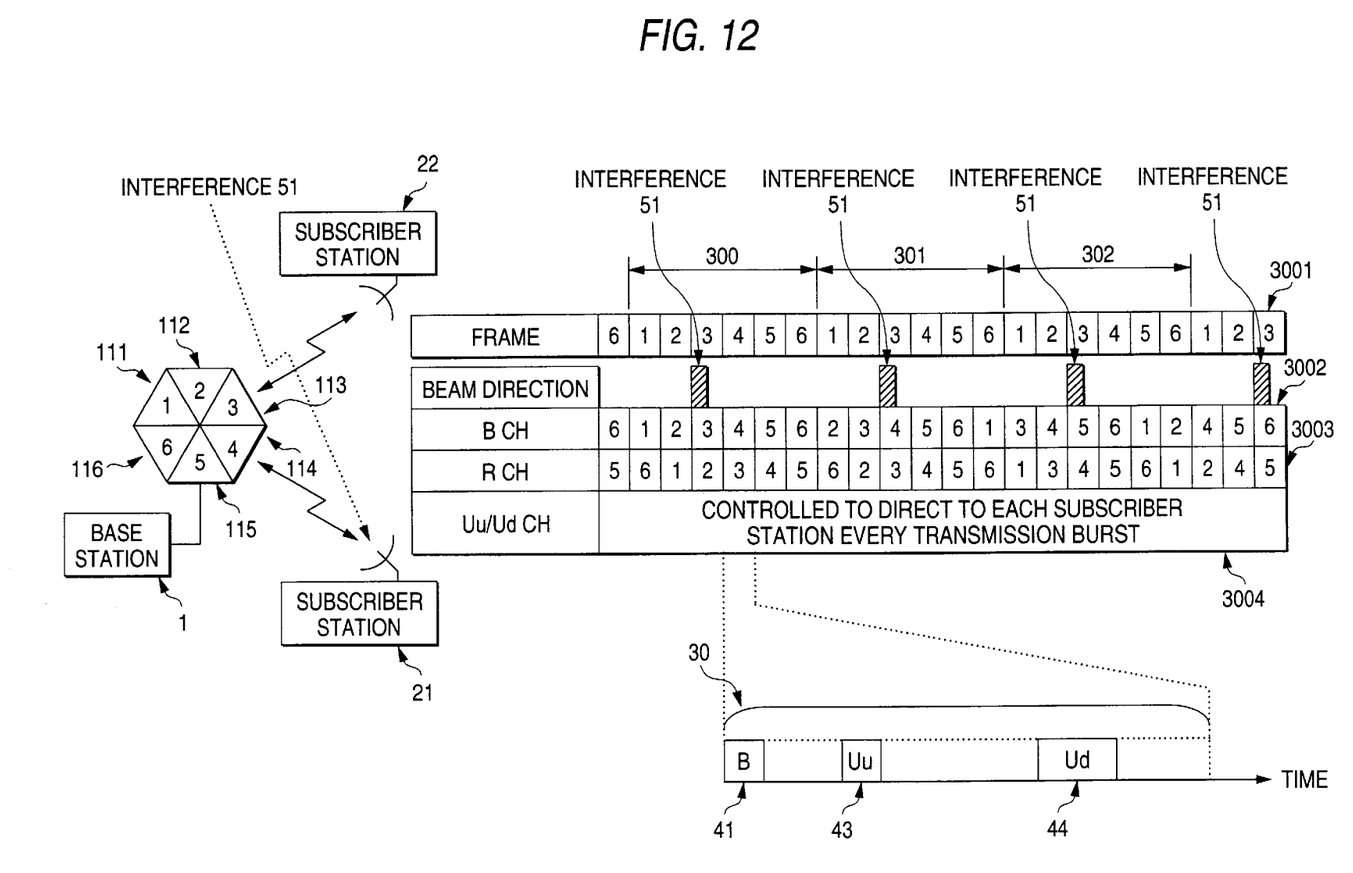
FIG. 12 is a diagram showing the interference avoidance method according to the embodiment 5 of the present invention.

FIG. 12 is a diagram showing an embodiment 6 of the present invention. The base station 1 communicates with the subscribers 21, 22 located in the service area of own station by using the type beam antennas 111 to 116. In FIG. 12, 3001 denotes shift of the frame number, 3002 denotes the direction of the antenna beam in the B channel in each frame (sector number), 3003 denotes the direction of the antenna beam in the R channel (sector number), and 3004 denotes the direction of the antenna beam in the user channel.

In the system shown in FIG. 12, the antenna beam directions in the B channels serving as the multiple access channel and the R channels serving as the random access channel are switched every frame, and periods in which the antenna beam takes a round of the service area, i.e., six frame periods are defined as one super frame 300 to 302.

The subscriber station which intends to issue the access request to the base station 1 checks the received content of the B channel, and then accesses the R channel in the succeeding frame. Therefore, the antenna beam direction of the R channel is controlled to be delayed from the B channel by one frame. Also, the antenna beam switching direction of the B channel is shifted frame by frame every super frame, e.g., the direction is started from the sector 1 in the super frame 300, the direction is started from the sector 2 in the super frame 301, the direction is started from the sector 3 in the super frame 302, and the like.

Here, the case is assumed where the subscriber station 21 receives the interference caused by the interference wave 51 from other station.

For the interference between the same communication systems, the sector switching type antennas are also mounted on the base station in the peripheral service area. Therefore, it may considered that the interference between the B channels or the R channels is caused in the super frame period, as shown in FIG. 12.

In FIG. 12, the interference wave 51 is generated in the third frame of the super frame. Thus, in the super frame 301 in which the subscriber station 21 receives the B channel via the this frame, the subscriber station 21 cannot receive the B channel due to the influence of the interference wave 51. However, as described above, since the antenna beam switching direction is shifted every super frame, there is no situation that the influence of the interference wave 51 on the subscriber station 21 carries on.

What is claimed is:

1. An interference avoidance method for a radio communication system in which multiple access is carried out between a base station and a plurality of subscriber stations by using a TDMA system, comprising the steps of changing time slot arrangements of multiple access channels for transmitting signals to the subscriber stations and random access channels for receiving signals from the subscriber stations at a predetermined TDMA frame interval, and informing the subscriber stations of time slot arrangement changing information via the multiple access channels which are selected prior to change of frames by at least one frame interval.

2. The interference avoidance method according to claim 1, wherein a plurality of multiple access channels or random access channels are arranged in one frame, and time slot arrangement of at least one channel out of said plurality of multiple access channels or the random access channels is changed at a predetermined TDMA frame interval.

3. The interference avoidance method according to claim 1, wherein the base station changes time slot arrangements of the multiple access channels or the random access channels based on a previously decided pattern, and informs the subscriber stations of current information on the pattern in which the time slot arrangement is changed via the multiple access channels.

4. An interference avoidance method for a radio communication system in which multiple access is carried out between a base station which has a sector switching type antenna and a plurality of subscriber stations by a TDMA system and one multiple access channel and one random access channel are assigned to one frame of the TDMA comprising the steps of:

changing sector switching procedures in assignment of these channels based on a previously decided pattern every TDMA super frame interval, and informing the subscriber stations of current information on the pattern in which sector switching is changed via the multiple access channels.

5. An interference avoidance method for a radio communication system in which multiple access is carried out between a base station which has a sector switching type antenna and a plurality of subscriber stations by a TDMA system and one multiple access channel and one random access channel are assigned to one frame of the TDMA system, comprising the steps of:

changing sector switching procedures in assignment of these channels based on a previously decided pattern every TDMA super frame interval, and informing the subscriber stations of the sector switching procedures after sector switching is changed via the multiple access channels, which are selected prior to change of procedures by at least one frame interval.

6. A method for determining the existence of interference in a radio communication system in which multiple access is carried out between a base station and a plurality of subscriber stations using a TDMA transmission system wherein a plurality of random access channels are assigned to one frame of the TDMA system, comprising the steps of:

determining an interference detection rate in each of said plurality of random access channels;

comparing the determined interference detection rates with each other; and determining the existence of interference in a particular random access channel when the determined interference detection rate of said particular random access channel is greater than determined interference detection rates in other random access channels of said plurality of random access channels by a predetermined amount.

7. The method according to claim 6, further comprising the steps of:

detecting said interference from said plurality of random access channels for transmitting signals from said plurality of subscriber stations to the base station, closing the random access channel in which interference has been detected, changing arrangement of the random access channel used by said subscriber station to another time slot, and informing the subscriber station of the closing of the random access channel and time slot arrangement change information via multiple access channels.

8. The method according to claim 7, further comprising the step of monitoring the closed random access channel for a predetermined time to detect whether or not an interference wave is present.

9. A method for determining the existence of interference in a radio communication system in which multiple access is carried out between a base station that has a sector switching type antenna for switching between multiple sectors of a service area of said base station and a plurality of subscriber stations, using a TDMA transmission system wherein a single random access channel is assigned to one frame of the TDMA system, comprising the steps of:

determining an interference detection rate in each of a plurality of random access channels assigned to different frames;

comparing the determined interference detection rates with each other; and determining the existence of interference in a particular sector when the determined interference detection rate of a random access channel in said particular sector is greater than determined interference detection rates in other random access channels by a predetermined amount.

10. The method according to claim 9, further comprising the steps of:

detecting said interference from said plurality of random access channels for transmitting signals from said plurality of subscriber stations to the base station, closing the random access channel in which interference has been detected, changing arrangement of the random access channel used by said subscriber station to another time slot, and informing the subscriber station of the closing of the random access channel and time slot arrangement change information via multiple access channels.

11. The method according to claim 10, further comprising the step of monitoring the closed random access channel for a predetermined time to detect whether or not an interference wave is present.

* * * * *